(12) United States Patent
Attwood

(10) Patent No.: US 6,249,156 B1
(45) Date of Patent: Jun. 19, 2001

(54) ELECTRIC CIRCUIT

(75) Inventor: Brian E. Attwood, Temecula, CA (US)

(73) Assignee: Zetex, PLC (GB)

( * ) Notice: Subject to any disclaimer, the term of this patent is extended or adjusted under 35 U.S.C. 154(b) by 0 days.

(21) Appl. No.: 09/431,665

(22) Filed: Nov. 1, 1999

(30) Foreign Application Priority Data

Oct. 30, 1998 (GB) .................................................. 9823731

(51) Int. Cl.[7] ................................. H03B 1/00; G05F 1/40
(52) U.S. Cl. ........................................... 327/110; 323/282
(58) Field of Search .................................. 327/108, 110, 327/112, 141, 177, 190, 374–377, 427, 434, 437; 323/282–285, 287

(56) References Cited

U.S. PATENT DOCUMENTS

| | | | |
|---|---|---|---|
| 5,485,076 | * 1/1996 | Schoenwald et al. | 323/225 |
| 5,592,071 | 1/1997 | Brown | 323/282 |
| 5,815,386 | * 9/1998 | Gordon | 323/222 |
| 5,973,946 | * 10/1999 | Yasumura | 363/89 |
| 6,038,142 | * 3/2000 | Fraidlin et al. | 363/17 |
| 6,091,616 | * 7/2000 | Jacobs et al. | 363/127 |
| 6,094,087 | * 7/2000 | He et al. | 327/434 |

FOREIGN PATENT DOCUMENTS

| | | |
|---|---|---|
| 0283254 A2 | 9/1988 | (EP) . |
| 2328565 | 9/1988 | (GB) . |
| WO97/22915 A1 | 6/1997 | (WO) . |

* cited by examiner

Primary Examiner—My-Trang Nu Ton

(57) ABSTRACT

An electric circuit comprising a transformer having first and second magnetically coupled inductors, a first switch which is connected to the first inductor, a second switch which is connected to the second inductor so as to be turned on and off by the second inductor; and a timing circuit for connection to the first switch for turning the first switch on and off. The second inductor is magnetically coupled to the first inductor such that flux reversal in the first inductor which occurs as the first switch is turned off will induce flux reversal in the second inductor which will thereby turn on the second switch. The circuit includes a damping element arranged to damp the operation of the second switch.

15 Claims, 9 Drawing Sheets

ELECTRIC CIRCUIT

The present invention relates to an electric circuit, and particularly though not exclusively to a synchronous regulator circuit.

Synchronous regulator circuits are used to provide regulate DC power for laptop computers, distributed power supplies, portable instruments, global positioning systems, etc. Synchronous regulator circuits may be used in a "bucks" arrangement, where an unregulated voltage is stepped down to a lower regulated voltage, or a "boost" arrangement where an unregulated voltage is stepped up to a higher regulated voltage.

In a known conventional synchronous regulator circuit a field effect transistor (MOSFET) is switched on and off by a pulse width modulated signal to provide a regulated step down function of an input voltage, for example an input of 5V is converted to a regulated 3.3V output, This is achieved by applying an appropriate pulse width to a low pass inductor and capacitor which provide the DC output. During a recovery cycle (i.e. when the modulated signal has a low value) the MOSFET is switched off, and current from the inductor flows to earth via a diode. The diode is usually a Shottky diode, to keep the forward voltage drop as low as possible and thus achieve good efficiency.

There is inevitably some loss associated with the use of a diode in this manner, and even a Shottky diode will have a forward drop across it of around 400 mV. This drop of voltage constitutes a loss of power in the circuit, and is particularly significant when the circuit is used to provide high load currents, for example 4A or higher.

The diode may be replaced by a MOSFET working in its reverse direction. Where a MOSFET is used the voltage drop can by substantially reduced if the MOSFET has a low enough resistance between drain and source when it is turned on. The efficiency of the circuit is thus improved, even taking into account the gate charge of the MOSFET. For example, if a MOSFET having an effective drain to source resistance of 20 mOhm (when turned on) is used as a synchronous rectifier, then at 4A it will only have a forward conduction drop of 80 mV as opposed to 400 mV of the Shottky diode. Efficiency is thus substantially improved, which is particularly important for portable and battery operated equipment.

A disadvantage of the use of a second MOSFET in this way is that operation of the second MOSFET must be synchronised with operation of the first MOSFET. If the MOSFETS are not synchronised and are both turned on together, a potentially destructive current will be allowed to flow though the circuit (so called conduction overlap).

Many companies provide dedicated integrated circuits which have a main output for driving the first MOSFET and a synchronous outputs for driving the second MOSFET of a synchronous regulator circuit. It is essential that the timing between the main output and the synchronous output is exactly synchronised, so that it does not allow any conduction overlap between devices (as described above). In the case of integrated circuits, appropriate sequencing is used to inhibit the cross coupling of gates, or a suitable dead time delay is introduced. This ensures that cross conduction cannot happen.

The provision of an integrated circuit having a main output and a synchronous output, is expensive. In order to overcome this problem drive for the second MOSFET must be derived externally, and yet still provide the correct timing sequences, to avoid cross conduction. A circuit of this type is shown in U.S. Pat. No. 5,592,071, issued Jan. 7, 1997, and assigned to Dell Corporation of Austin Tex., USA (the circuit is shown in FIG. 1).

The circuit comprises a first MOSFET Q1 and a second MOSFET Q2, the source of the first MOSFET Q1 being connected to a primary inductor of a transformer T1, and the gate of the second MOSFET Q2 being connected to a secondary inductor of the transformer T1, via a diode D1 and resistor 106. The circuit has a third MOSFET Q3, the source of the third MOSFET Q3 being connected to ground, and the gate of the third MOSFET Q3 being connected, together with the gate of the first MOSFET Q1, to a timer circuit U1 which provides a pulse width modulated signal. When the modulated signal is high the first Q1 and third Q3 MOSFETS are turned on, and current flows through the first MOSFET Q1 and into the transformer T1, charging a tank circuit formed by the primary inductor of the transformer T1 and a capacitor 104 connected in parallel across an output of the circuit. The third MOSFET Q3 clamps the gate of three second MOSFET to ground, thereby shutting it off and ensuring that current cannot flow through the second MOSFET Q2 when the first MOSFET Q1 is turned on. When the pulse width modulated signal is low the first Q1 and third Q3 MOSPETS turned off, causing a flux reversal of the primary and secondary inductors of the transformer T1. When this occurs the secondary inductor of the transformer T1 forward biases the diode D1 and drives the gate of the second MOSFET Q2 high. The second MOSFET Q2 turns on and conducts, providing a free-wheeling circuit through the diode D1 to ground. Thus, the circuit uses flux reversal of the transformer T1, via the secondary inductor of the transformer, to turn on the second MOSFET Q2. A feedback circuit having a shunt regulator U1 is used to regulate operation of the timer circuit U2 such that the voltage output from the circuit is properly regulated.

The circuit is advantageous because it removes the requirement for a second synchronous pulse width modulated signal to be provided by the timer circuit U1.

In addition to the buck regulator circuit shown, U.S. Pat. No. 5,592,071 also describes a boost regulator circuit which operates in the same manner.

The circuits described in U.S. Pat. No. 5,592,071 suffer from the disadvantage that they require three MOSFETS (or other equivalent switches). It is an object of the invention to provide an electric circuit which overcomes this disadvantage.

According to the invention there is provided an electric circuit comprising:

a transformer having first and second magnetically coupled inductors;

a first switch which is connected to the first inductor;

a second switch which is connected to the second inductor so as to be turned on and off by the second inductor; and a timing circuit for connection to the first switch for turning the first switch on and off;

the second inductor being magnetically couple to the first inductor such that flux reversal in the first inductor which occurs as the first Switch is turned off will induce flux reversal in the second inductor which will thereby turn on the second switch, wherein the circuit further includes a damping element arranged to damp the operation of the second switch.

The damping element acts to inhibit current flow through the second switch as the first switch is turned on, thereby allowing flux reversal to occur in the first and second inductors. The flux reversal in the second inductor turns off the second switch. The damping element thus safeguards against shoot through current and cross conduction, and also damps any ringing present in the circuit.

Preferably, the damping element is connected to an output of the second switch.

Preferably, the damping element is connected between the output of the second switch and an output of the circuit.

The electric circuit may comprise part of a synchronous regulator circuit, which may be a boost circuit, a buck circuit or a buck-boost circuit.

In a conventional buck circuit, the first switch has an input for connection to a DC voltage source and an output connected to the first inductor of the transformer, and the second switch has an output connected to an output of the first switch. The electric circuit described according to the invention may comprise part of a buck circuit. Where this is the case, the damping element is preferably connected between the output of the second switch and the first inductor.

In a conventional boost circuit, the first switch has an input connected to an output of the first inductor and an output connected to ground, and the second switch has an input connected to an input of the first switch. An output from the boost circuit is taken from an output of the second switch. The electric circuit described according to the invention may comprise part of a boost circuit. Where this is the case, the damping element is preferably connected directly between the output of the second inductor and the output of the boost circuit.

Preferably, the damping element is a material having a square loop characteristic. The material may be amorphous, or may be a ferrite having the square loop characteristic. The damping element is preferably provided as a bead.

At least one of the switches may be a field effect transistor (MOSFET). The first switch may be a bi-polar junction transistor. Any suitable i combination of p-type field effect transistors, n-type field effect transistors and npn or pnp type bi-polar junction transistors may be used.

Feedback to the timing circuit may be provided via a voltage divider circuit from the output of the synchronous regulator circuit.

Suitably, there is no electrical connection between the first and second inductors. This arrangement is used when the electric circuit comprises part of a buck circuit. The second inductor preferably comprises a single wire terminated separately from the first inductor.

Specific embodiments of the invention will now be described with reference to the accompanying figures, in which.

Figure 1:
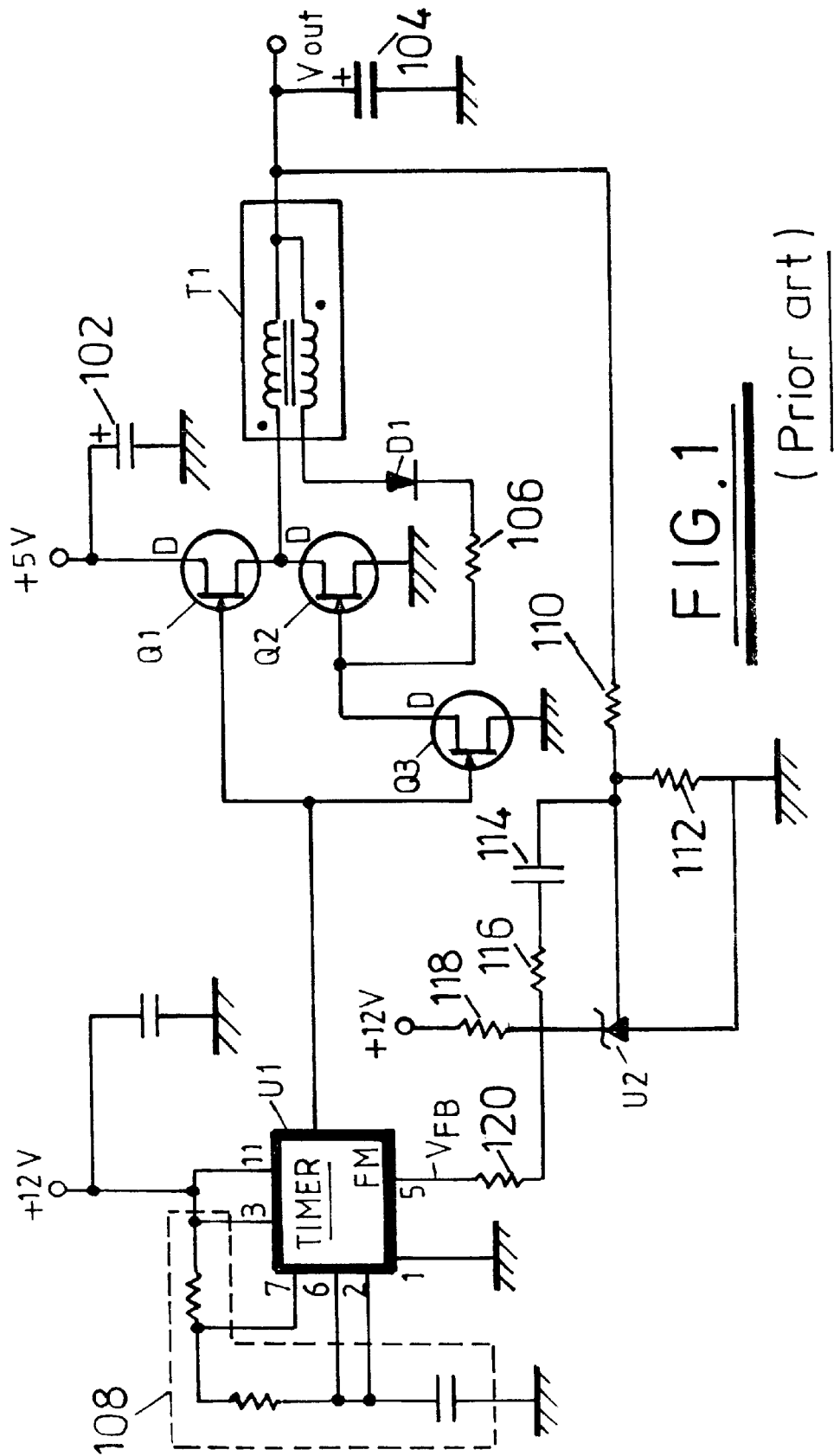
FIG. 1 is a circuit diagram of a prior art synchronous regulator circuit.
Figure 2:
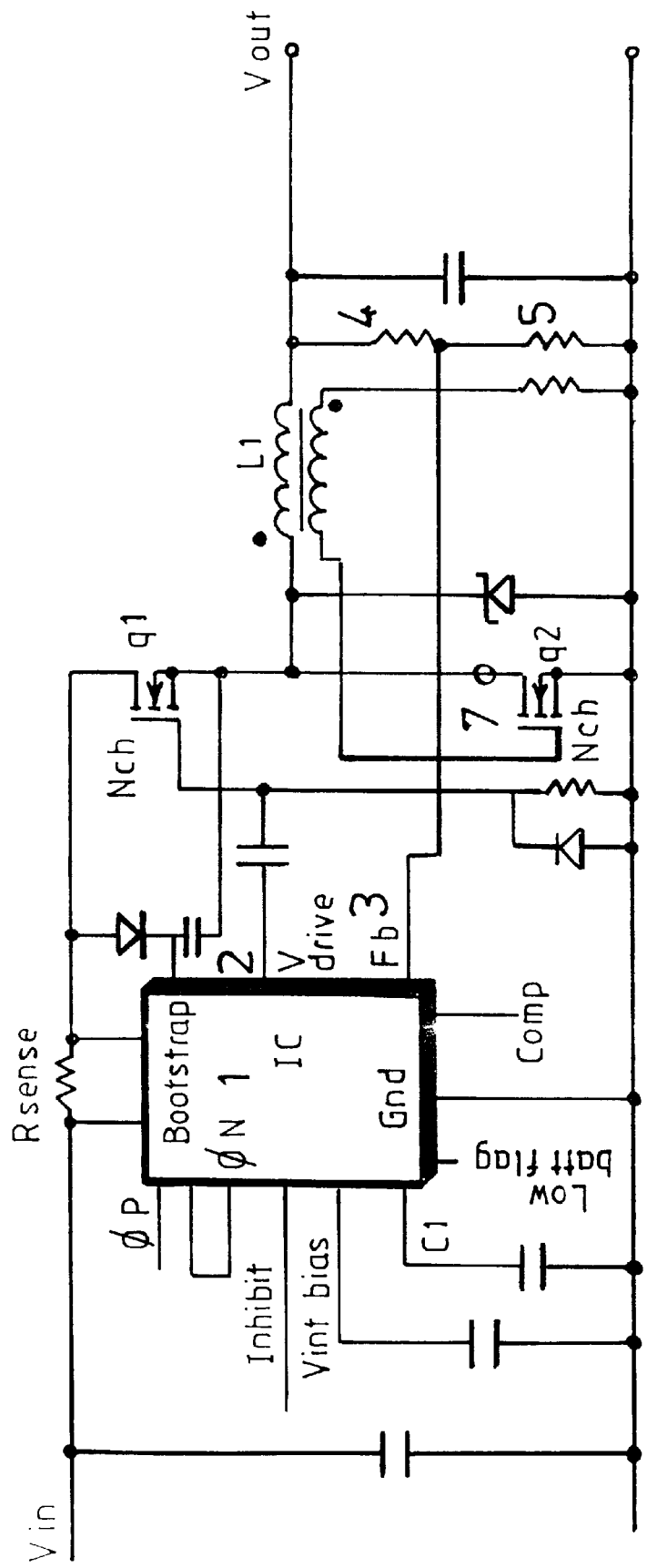
FIG. 2 is a circuit diagram of a synchronous regulator circuit according to a first embodiment the invention.

In FIG. 2 a synchronous regulator circuit comprises an integrated timer circuit 1 which provides a pulse width modulated signal at a drive output 2. The pulse width of the signal is regulated by feedback connected via an input 3. A primary MOSFET q1 has a gate which is connected via a capacitor to the drive output 2 of the timer 1. A source of the primary MOSFET q1 is connected to the dotted input of a primary coil of an inductor L1. An opposite terminal of the primary inductor L1 provides an output from the circuit.

A single wire of the inductor L1 is peeled off from the remainder of the wires and is terminated separately. This provides very low leakage inductance due to the bifilar winding of the inductor L1, and no extra cost is associated with the inductor L1 other than its separate termination. The separated winding gives an isolated replica of the signal present on the primary MOSFET q1 output, but in opposite phase due to the connection of the secondary winding, A primary end of this winding is connected via a resistance to ground, and an opposite end of the winding is connected to a gate of a secondary MOSFET q2. Thus, the timing of the state of the secondary MOSFET q2 is determined by the state of the primary MOSFET q1 (the timing is automatic).

Cross conduction could occur in the circuit of FIG. 2 if there was a discrepancy between the gate threshold levels required for full enhancement of the MOSFETs q1 and q2. If cross conduction were to occur then it should be consistent and very short in duration, typically less than 10 ns. In order to safeguard against this eventuality and also to damp any ringing present in the circuit, a very small ferrite or amorphous bead 7 is located at the drain of the secondary MOSFET q2. The ferrite or amorphous bead 7 has a square loop characteristic. Material having this characteristic is inexpensive, will reliably avoid any shoot through current or cross conduction problems, and will ensure that the circuit provides very clean electromagnetic induction (EMI) waveforms. Suitable square loop characteristic material is available from Philips (component number Philips 3R1), and is described on the Philips web site at www.philips.com. Suitable square loop characteristic material is also available from Fair-Rite (component number Fair-Rite 85), and is described on the Fair-Rite web site at www.Fair-Rite.com.

Feedback to the integrated timer circuit 1 is provide via a voltage divider comprising resistors 4 and 5.

The circuit is advantageous compared to that shown in U.S. Pat. No. 5,592,071 because it avoids the requirement for a third MOSFET.

Figure 3:
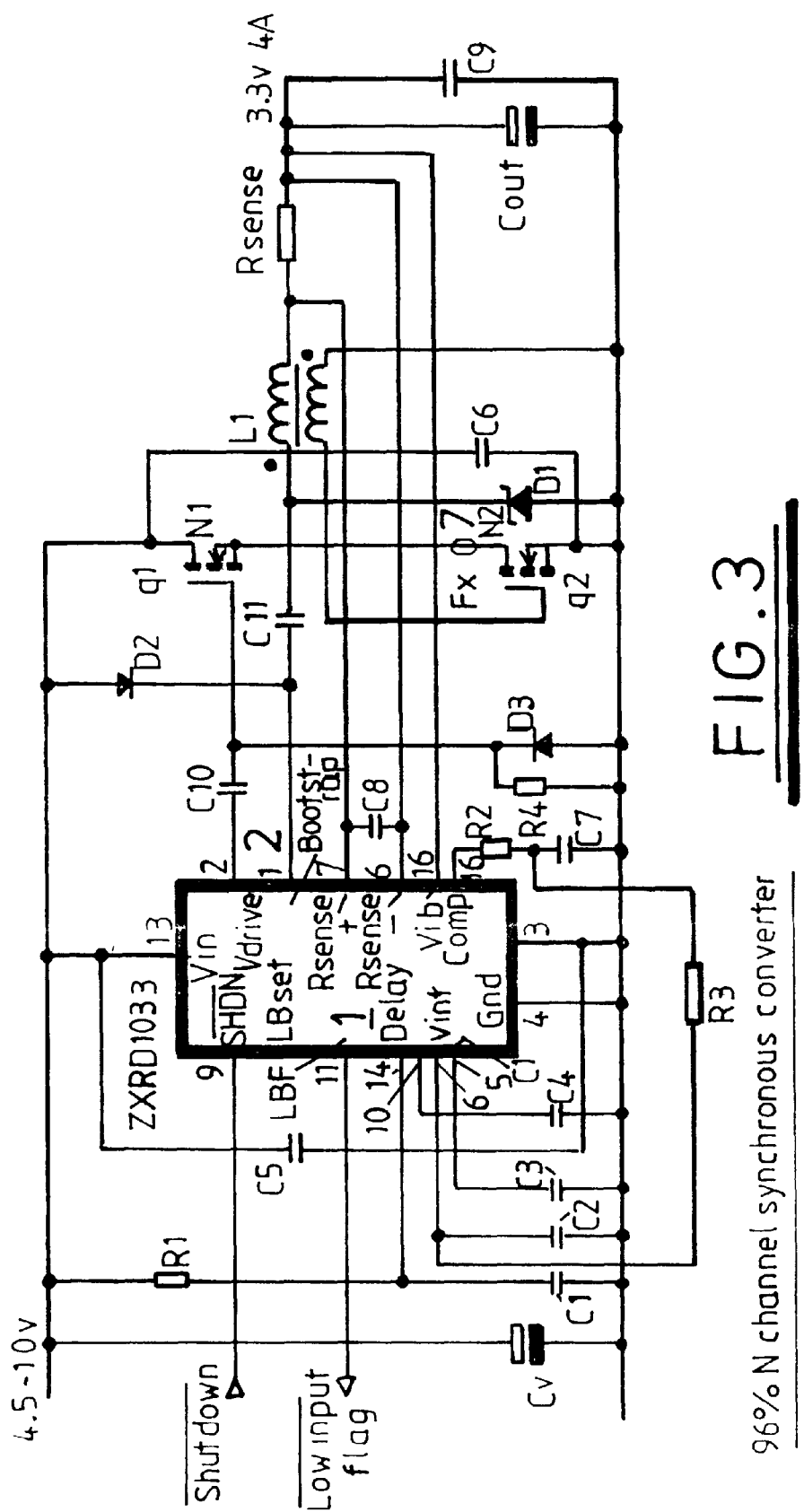
FIG. 3 is a circuit diagram of a synchronous regulator circuit according to a second embodiment of the invention.

FIG. 3 shows a regulator circuit based upon the circuit shown in FIG. 2. Although the circuit shown in FIG. 3 includes several modifications which were considered useful during development of the circuit, the circuit shown in FIG. 3 operates in the same manner as the circuit shown in FIG. 2.

Figure 4:
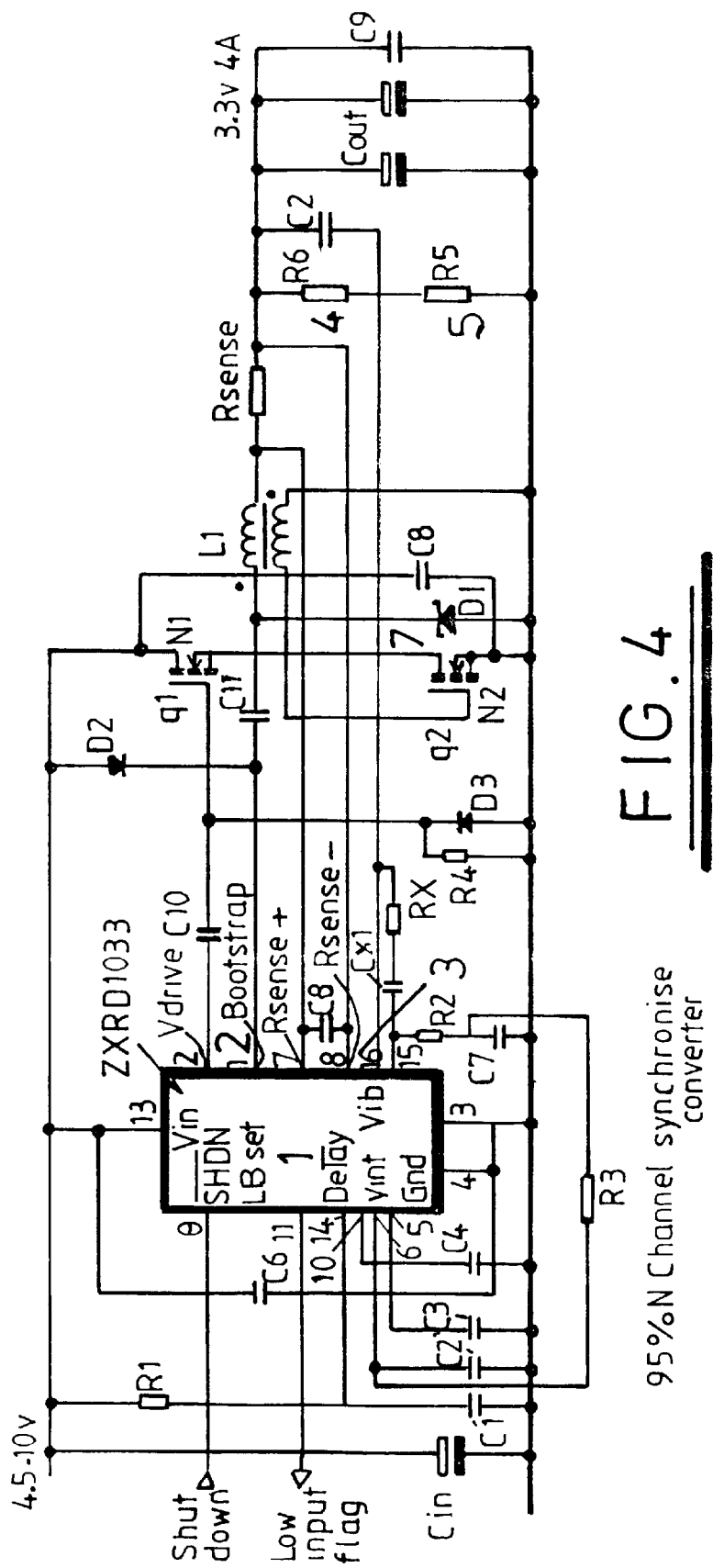
FIG. 4 is a circuit diagram of a synchronous regulator circuit according to a third embodiment of the invention.

FIG. 4 shows a regulator circuit based upon the circuit shown in FIG. 3. The circuit in FIG. 4 includes modifications to allow adjustment of the voltage output from the circuit.

Figure 5:
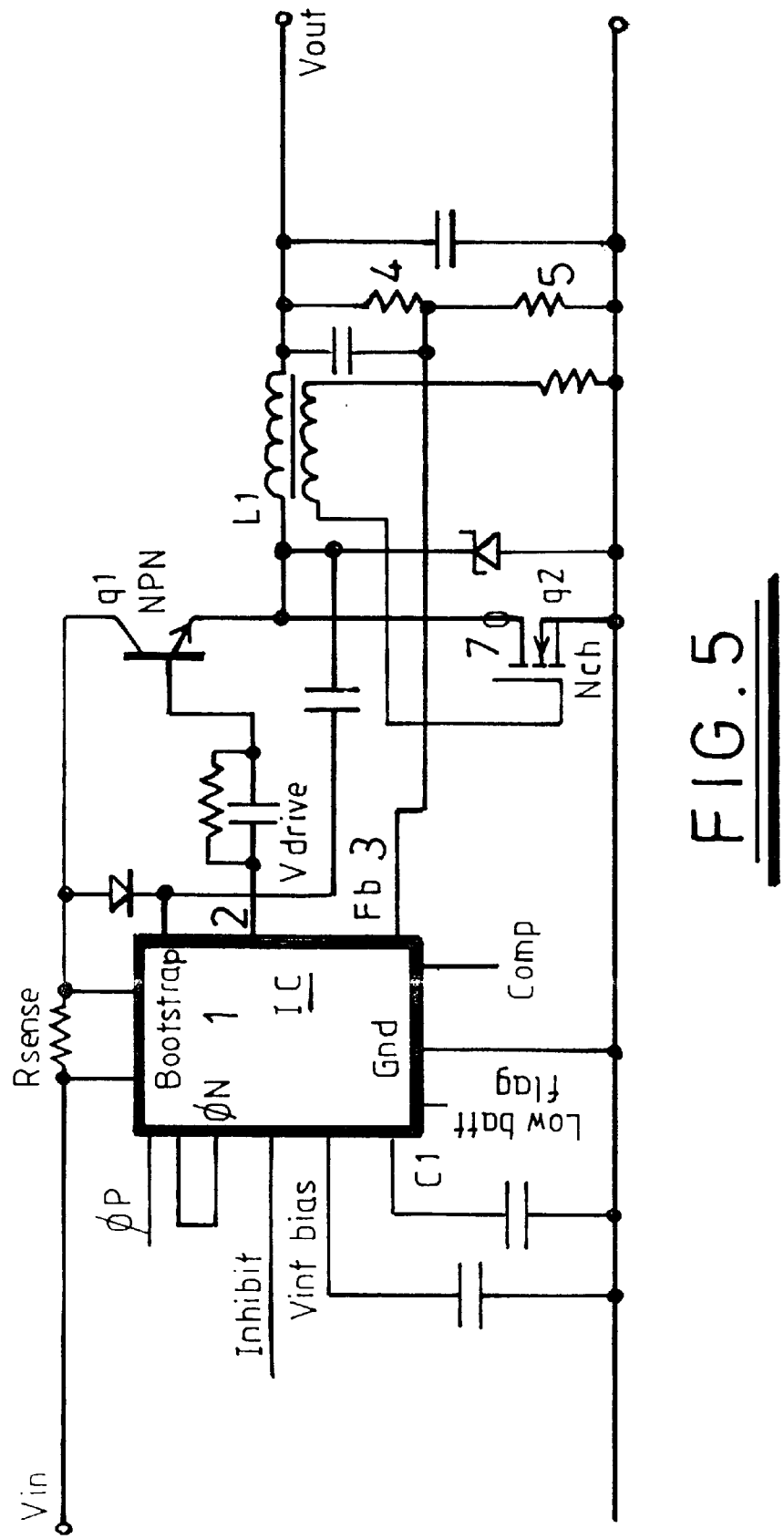
FIG. 5 is a circuit diagram of a synchronous regulator circuit according to a fourth embodiment of the invention.

FIG. 5 shows a regulator circuit which utilises an npn bipolar transistor q1 in place of the primary MOSFET q1.

Figure 6:
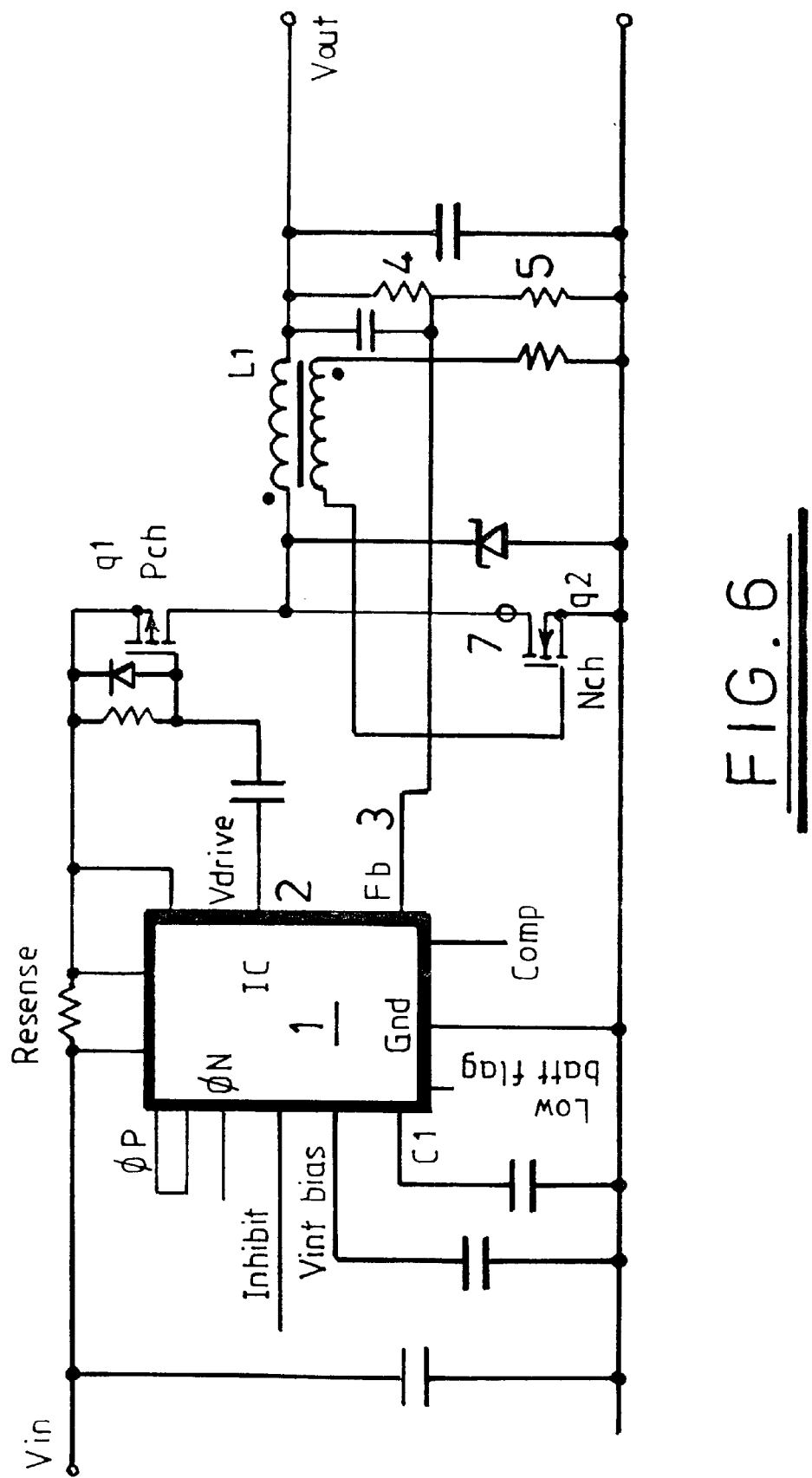
FIG. 6 is a circuit diagram of a synchronous regulator circuit according to a fifth embodiment of the invention.

FIG. 6 shows a synchronous regulator circuit having a p-type primary q1 and an n-type secondary MOSFET q2.

Figure 7:
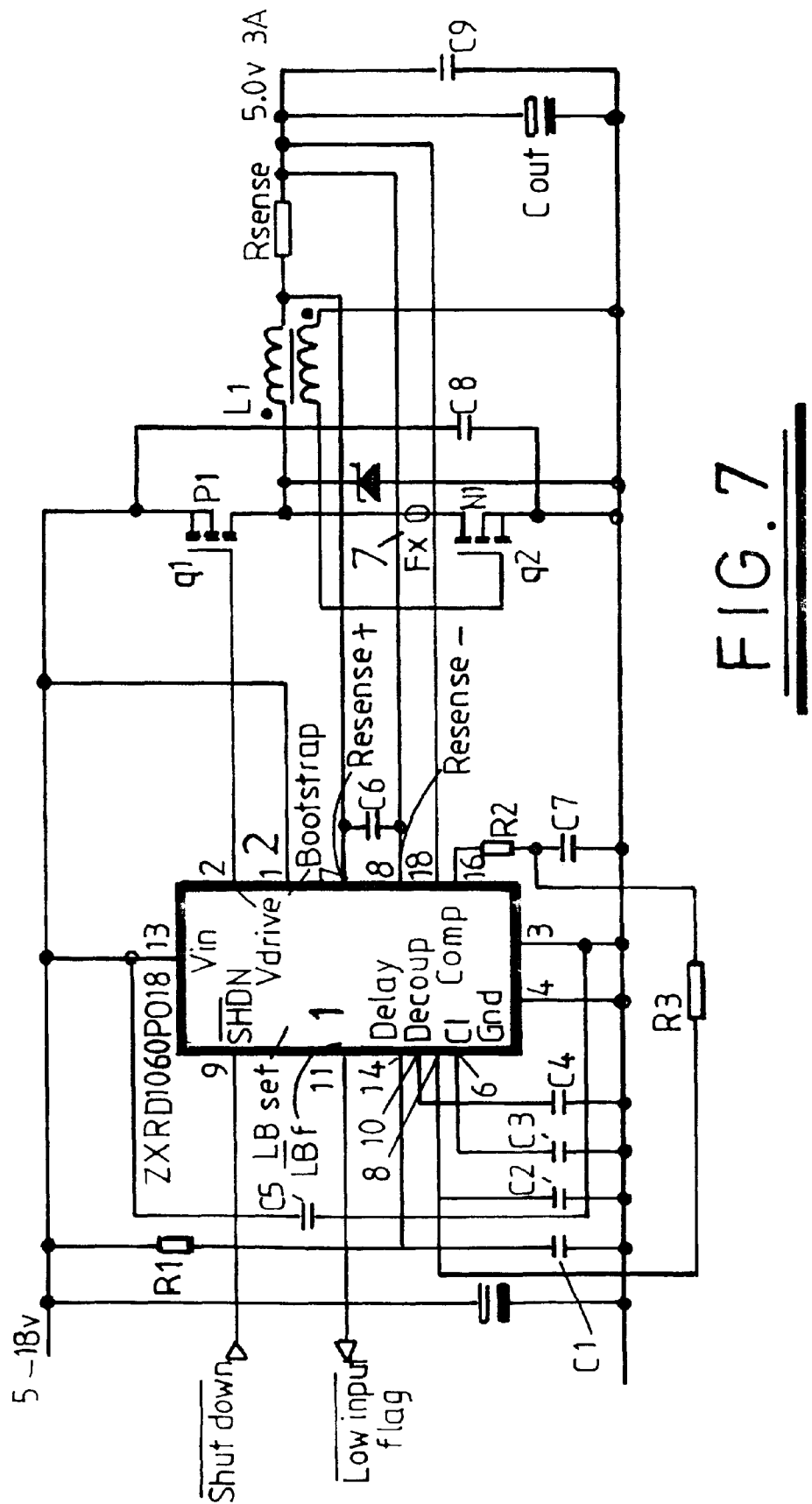
FIG. 7 is a circuit diagram of a synchronous regulator circuit according to a sixth embodiment of the invention.

FIG. 7 shows a regulator circuit based upon the circuit shown in FIG. 6. Although the circuit shown in FIG. 7 includes several modifications which were considered useful during development of the circuit, the circuit shown in FIG. 7 operates in the same manner as the circuit shown in FIG. 6.

Figure 8:
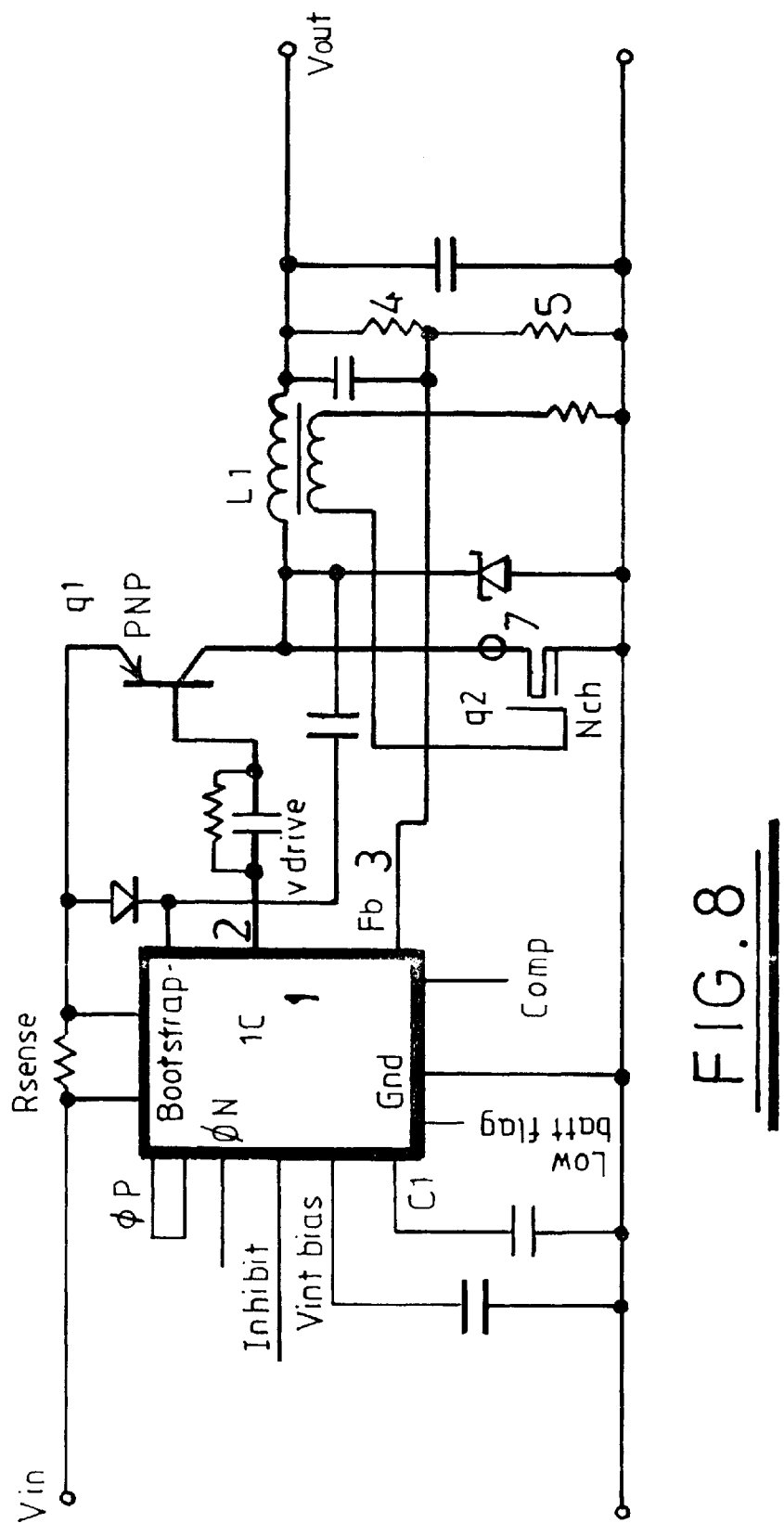
FIG. 8 is a circuit diagram of a synchronous regulator circuit according to a seventh embodiment of the invention.

FIG. 8 shows a synchronous regulator circuit having a pnp bi-polar primary MOSFET transistor q1 together with an n-type MOSFET as the secondary transistor q2.

In each of the circuits shown in FIGS. 3 to 8 switching is controlled by the timing chip 1, in the same manner as described in relation to FIG. 2.

Figure 9:
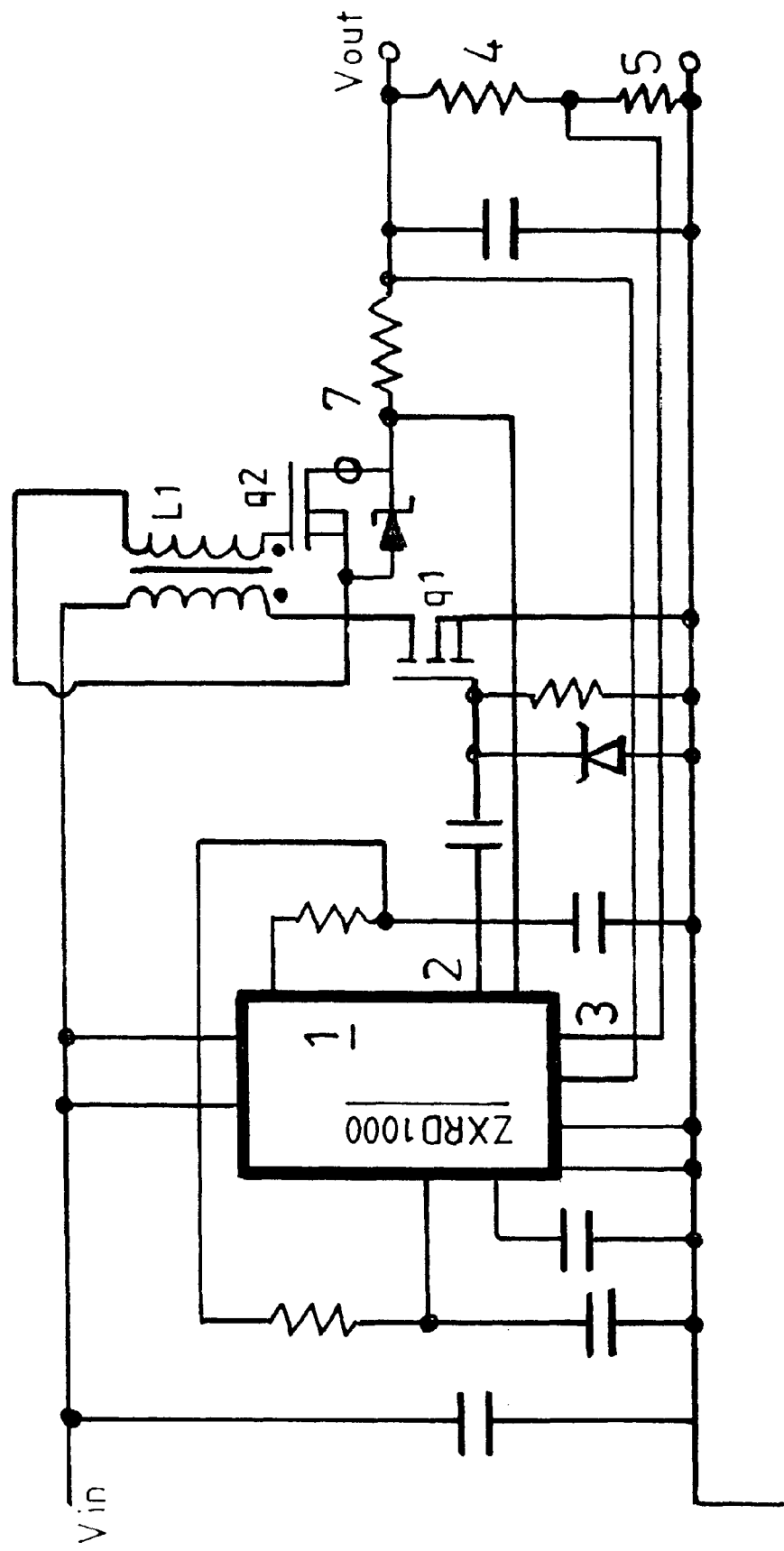
FIG. 9 is a circuit diagram of a synchronous regulator circuit according to an eighth embodiment of the invention.

The synchronous regulator circuits illustrated in FIGS. 2 to 8 are all buck circuits. A boost circuit is illustrated in FIG. 9. The reference numbers used in FIG. 9 correspond to the reference numbers used in FIGS. 2 to 8. The modifications required to construct a buck-boost circuit according to the invention will be apparent to a person skilled in the art.

What is claimed is:

1. An electric circuit comprising:

a transformer having first and second magnetically coupled inductors;

a first switch which is connected to the first inductor;

a second switch which is connected to the second inductor so as to be turned on and off by the second inductor; and a timing circuit for connection to the first switch for turning the first switch on and off;

the second inductor being magnetically coupled to the first inductor such that flux reversal in the first inductor which occurs as the first switch is turned off will induce flux reversal in the second inductor which will thereby turn on the second switch, wherein the circuit further includes a damping element arranged to damp the operation of the second switch.

2. A circuit according to claim 1, wherein the damping element is connected to an output of the second switch.

3. A circuit according to claim 2, wherein the damping element is connected between the output of the second switch and an output of the circuit.

4. A circuit according to claim 1, wherein the first switch has an input for connection to a DC voltage source and an output connected to the first inductor of the transformer, and the second switch has an output connected to an output of the first switch.

5. A circuit according to claim 4, wherein the damping element is connected between the output of the second switch and the first inductor.

6. A circuit according to claim 4, wherein the damping element is connected between the output of the first switch and the output of the second switch.

7. A circuit according to claim 1, wherein the damping element is a material having a square loop characteristic.

8. A circuit according to claim 7, wherein the square loop characteristic material is amorphous.

9. A circuit according to claim 7, wherein the square loop characteristic material is a ferrite.

10. A circuit according to claim 7, wherein the square loop characteristic material is provided as a bead.

11. A circuit according to claim 1, wherein at least one of the switches is a field effect transistor (MOSFET).

12. A circuit according to claim 1, wherein the first switch is a bi-polar junction transistor.

13. A circuit according to claim 1, wherein there is no electrical connection between the first and second inductors.

14. A circuit according to claim 13, wherein the first switch has an input for connection to a DC voltage source and an output connected to the first inductor of the transformer, and the second switch has an input connected to an output of the first switch.

15. A circuit according to claim 13, wherein the second inductor comprises a single wire terminated separately from the first inductor.

* * * * *